United States Patent [19]

Fradin

[11] 4,320,152

[45] Mar. 16, 1982

[54] PROCESS FOR PREPARING A MINCED MEAT PRODUCT

[75] Inventor: Maurice Fradin, Saint Jean de Monts, France

[73] Assignee: Chiron S.A., Saint Jean de Monts, France

[21] Appl. No.: 26,641

[22] Filed: Apr. 3, 1979

[30] Foreign Application Priority Data

Apr. 5, 1978 [FR] France ................. 78 10157

[51] Int. Cl.³ ..................... A23L 1/01; A23L 1/31
[52] U.S. Cl. ................. 426/618; 426/518; 426/524; 426/622; 426/634; 426/646; 426/656
[58] Field of Search ........... 426/524, 656, 802, 574, 426/646, 549, 518, 622, 634, 618

[56] References Cited

U.S. PATENT DOCUMENTS

| | | | |
|---|---|---|---|
| 2,560,621 | 7/1951 | Wrensshall | 426/574 |
| 3,689,285 | 9/1972 | Griffin | 426/646 |
| 3,917,860 | 11/1975 | Ayres et al. | 426/524 |
| 4,084,017 | 4/1978 | Kim | 426/524 |
| 4,132,809 | 1/1979 | Desrosier | 426/802 |

*Primary Examiner*—Raymond N. Jones
*Assistant Examiner*—Elizabeth A. Hatcher
*Attorney, Agent, or Firm*—Brisebois & Kruger

[57] ABSTRACT

A minced meat product, which can be grilled, fried or roasted is provided from raw minced meat and cereal, leguminous plant or protide-containing substances in the form of flour, middlings, an isolated material or a concentrate, which has been wetted with milk, the product being refrigerated or deep-frozen.

5 Claims, No Drawings

PROCESS FOR PREPARING A MINCED MEAT PRODUCT

The present invention relates to a product, based on minced meat, which can be grilled, roasted or fried and comprises other nutrient elements in addition to the nutrient elements provided by the meat.

Minced steaks based on beef essentially consist, as is known, of protides and lipids. In order to balance the diet, they must therefore be eaten together with products, such as vegetable products, which provide carbohydrates, so as to redress the foodstuffs balance.

The Applicant has discovered that the nutrient properties of fresh meat and those of milk can be combined in a single product. It has also been found that it is possible to vary the nutrient value and the composition, with regard to protides and carbohydrates, of a product, depending on the desired nutritional requirements, by using milk. The invention in particular makes it possible to increase the ratio of calcium to phosphorus, which ratio is low in meat. The invention furthermore makes it possible to prepare an economical product having a balanced nutrient value and good taste qualities.

The combined use of milk and fresh meat in order to prepare therefrom a product suitable for grilling, frying or roasting, however, raises difficulties as to the consistency of the final product in view of the liquid nature of milk. The Applicant has now discovered a product which comprises minced meat and milk and which has a consistency, a holding power and a texture similar to those of minced meat, these characteristics making it possible to prepare grills, roasts or fried dishes with this product.

In addition to the consistency, a product of this kind based on fresh meat must conform to very stringent bacteriological standards; this means, in effect that its preparation must be capable of being carried out without the development of germs.

The product according to the invention, which can be grilled, roasted or fried, is in the form of a deep-frozen or refrigerated product which comprises raw minced meat, and at least one of a cereal, leguminous plant or protide-containing substance, in the form of flour, middlings, semolina or granulated flour concentrate or an isolated constituent, moistened (or wetted) with milk.

The meats which can be used according to the invention can be, for example, meat from cattle, horsemeat, meat from sheep, poultry, game and fish. It is preferred to use beef.

The cereals which can be used according to the invention are, in particular, in the form of flour, middlings, semolina or granulated flour, such as of maize, wheat or rice.

The leguminous plants or protide-containing substances which can be used are in the form of flour, such as potato-flour, or of a concentrate or isolated constituent of proteins such as of soya, field beans, sunflower or colza, if desired in a texturised form.

A particularly preferred embodiment of the invention consists in using middlings semolina, and in particular wheat middlings, semolina, or maize middlings semolina, or concentrates of texturised soya proteins, if desired in the form of a mixture.

The milk used in the product according to the invention can be skimmed milk, semi-skimmed milk or whole milk; milk prepared from powdered milk is preferably used.

The proportions of these various constituents can be varied depending on the desired consistency of the final product which is to be achieved and on the nutrient value which it is desired to give to the product.

According to the invention, 20 to 70% of raw minced meat and 80 to 30% of cereals, leguminous plants or protide-containing substances in the form of flour, middlings, a concentrate or isolated product, moistened (or wetted) with milk are preferably used.

According to the invention, it is possible to add other ingredients to the product according to the invention; inter alia, whole eggs, which are preferably dried, can be added in an amount of, say, 0.5 to 5% by weight relative to the weight of the final product. It is also possible to add to this product seasonings which are customarily used for fresh meat, such as stew stocks, salt, pepper, breadcrumbs, various flavourings such as spices in powder form, nutmeg, cinnamon, thyme and bayleaf, meat flavourings, products which intensify the taste based on meat extracts and vegetable protein hydrolysates, lacto-proteins, and white of egg for example, generally in amounts from 0.5 to 5% by weight.

The products of this invention are suitably prepared by, in a first stage, moistening the flour, the middlings, the semolina or granulated flour, the concentrate, or the isolated constituent, with milk, so as to obtain a product having a pasty consistency. The middlings or semolina can therefore then be cooked in milk at a temperature of, say, 80° to 95° C. for a sufficient time to give a very pasty product, preferably for 10 to 30 minutes.

The protein hydrolysates or concentrates, if desired in a texturised form, can be moistened by heating at a temperature of, say, 70° to 90° C. for, say, 5 to 20 minutes, or at ambient temperature, namely about 20° C., for, say, 30 to 60 minutes. 10 to 25% of the above referred to of middlings, semolina or granulated flour, concentrates, isolated constituents, or flour, 5 to 15% of, preferably, skimmed milk powder, 60 to 80% of water and, if desired, 0 to 5% of granulated dehydrated stock and 9 to 3% of various seasonings such as salt and pepper, are preferably used for this purpose.

The composition thus prepared is cooled either to 0° to 5° C. in the case of continuous manufacture or is cooled to about −20° C. if it is intended to be stored. This cooling can be carried out by any suitable means, in particular by passing the composition through a tunnel at −40° C.

The composition is then mixed with the meat at a temperature below 0° C., for example about −5° C., in a mincing machine which is suitably kept at a temperature below 0° C. and preferably at −5° to −10° C.

The whole is generally coarsely minced using a 12 to 6 mm perforated plate.

Alternatively, so-called "warm" meat can be mixed at this stage with chips of semolina mixture or concentrates at a temperature of −5° C.

The resulting product is then preferably conveyed, for example by means of an endless screw, to a second mincing machine where it is mixed, if desired, with other ingredients such as whole dried eggs, white of egg and various flavourings as well as the other additives mentioned above.

After mixing, the whole is subjected to a second mincing operation, the mincing machine desirably being kept at a temperature below 0°, and preferably between −5° and −10° C., and being provided with a 6 to 2 mm perforated plate.

The product thus prepared can then be mixed and taken up by an endless screw to be shaped and then refrigerated or deep-frozen.

Cooking and tasting tests have established that this product holds together well on cooking and has a pleasant taste.

It has been found in particular, and this is surprising, that the taste of the cereals and the leguminous plants or protide-containing substances introduced is completely neutralised; this is thought to be due to the combination of these products with the milk.

The following Examples further illustrate the present invention. The percentages therein are given by weight.

EXAMPLE 1

A cooked semolina mixture is prepared, using the following ingredients:

| | |
|---|---|
| Water | 70.5% |
| Maize middlings (grits) | 17.5% |
| Skimmed milk powder | 7.0% |
| Granulated dehydrated stock | 3.5% |
| Salt | 1.4% |
| Pepper | 0.1% |

The temperature of the semolina mixture is kept at between 90° and 95° C. for about 25 minutes, until the mixture becomes very pasty.

When cooking is complete, the semolina mixture is poured into vats to about 6 cm thickness, and deep-freezing is carried out at −40° C.

The blocks of semolina mixture, stored at −30° C., are conveyed into a machine for breaking up the deep-frozen mass, for the purpose of converting the blocks into chips, in a room having a temperature of about 0° C.

The meat is minced in the same room.

50 kg of beef, containing 20% of lipids, at a temperature of 1° to 5° C., and 41 kg of chips of deepfrozen semolina mixture are introduced into a first mincing machine having a 8 mm perforated plate.

The other ingredients, 6 kg of breadcrumbs, 3 kg of whole dried eggs, 100 g of powdered nutmeg and, if desired, other flavourings, are added to this mixture to provide 1 to 5% of the total weight and the whole is mixed and finally is minced again in a mincing machine having a 4 mm perforated plate.

The whole, at a temperature of −5° to −10° C., is taken up by an endless screw in order to be shaped.

Once the product has been shaped, it is conveyed directly into a deep-freezing machine at −40° C., in which it is brought to a temperature of −10° to −15° C. and is stored, after being packaged, in a room at −30° C.

The product thus prepared was subjected to a cooking and tasting test. The product, in the deep-frozen state, is cooked for about 4 to 5 minutes in a frying pan containing oil; it rapidly assumes a golden colour on the outside whilst the inside remains pink.

On tasting, the product has a pleasant taste and a soft texture and consistency. It is found that it holds together well on cooking.

The deep-frozen product furthermore conforms to the bacteriological standards laid down by foodstuffs legislation in France regarding minced meats. This product has the following biochemical composition:

| | |
|---|---|
| Moisture content | 59.5% |
| Lipids | 11.3% |
| Carbohydrates | 13.5% |
| Protides | 13.4% |
| Collagen | 1.1% |
| (Percentage of Collagen to Protides | 8.1%) |
| Mineral salts | 2.3% |
| Calories | 210 |

This is a balanced product since it is simultaneously a protein-containing foodstuff and a foodstuff which provides energy and it is found, inter alia, that the ratio of calcium to phosphorus is distinctly higher than that in a conventional minced steak.

EXAMPLE 2

A semolina mixture is prepared under the same conditions as those indicated in Example 1, using the following composition:

| | |
|---|---|
| Water | 6.000 kg |
| Powdered milk | 0.900 kg |
| Maize middlings | 2.000 kg |
| Salt | 0.125 kg |
| Pepper | 0.005 kg |
| Soup | 0.250 kg |

This mixture is cooked for about 30 minutes, the weight of the semolina mixture being 8.260 kg.

The deep-frozen semolina mixture is mixed with minced meat, as in Example 1, in the following proportions:

| | |
|---|---|
| Minced meat | 60% |
| Deep-frozen cooked semolina mixture | 38% |
| Dried eggs | 2% by weight |

The mincing and shaping are carried out as described in Example 1.

EXAMPLE 3

A soya protein concentrate is prepared by cooking the following composition:

| | quantity | % |
|---|---|---|
| Water | 3.000 kg | 66.5% |
| Texturised soya protein concentrate | 1.000 kg | 22.2% |
| Milk | 0.300 kg | 6.7% |
| Stock | 0.150 kg | 3.3% |
| Salt | 0.060 kg | 1.3% |

The texturised concentrate of soya proteins is cooked for about 10 to 15 minutes until it has been completely remoistened, the temperature being kept at between 80° and 90° C. during this operation. The losses on cooking are about 15%. This remoistened concentrate is deep-frozen as indicated in Example 1 and is then converted into chips before being mixed with the minced meat.

The same procedure is carried out as indicated in Example 1, mixing 2.5 kg of meat, containing about 20% of lipids, and 2.5 kg of remoistened concentrate in the form of chips.

The product thus prepared is then deep-frozen and shaped as above.

The product thus manufactured has the following biochemical composition:

| | |
|---|---|
| Moisture content | 65.5% |
| Carbohydrates | 4.1% |
| Lipids | 10.0% |
| Protides | 17.7% |
| Collagen | 1.1% |
| (Collagen/Protides | 6.2%) |
| Mineral salts | 2.7% |
| Calories | 180 |

This composition is particularly valuable since the protide content in the final product is approximately the same as that of meat, namely 18 to 20%.

EXAMPLE 4

A concentrate is prepared from the following composition by mixing the various ingredients so as to achieve complete remoistening of the texturised concentrate of soya proteins at ambient temperature:

| | quantity | % |
|---|---|---|
| Water | 2.000 kg | 59.9% |
| Texturised soya protein concentrate | 1.000 kg | 29.9% |
| Milk | 0.200 kg | 6.0% |
| Stock | 0.100 kg | 3.0% |
| Salt | 0.040 kg | 1.2% |

Remoistening is complete after about 45 minutes. The temperature is kept at about 20° C. throughout the operation.

This concentrate is deep-frozen as above and the deep-frozen blocks of concentrate are then converted into chips before they are introduced into the mincing machines as indicated in Example 1.

A second mincing operation using a 4 mm perforated plate is carried out; this makes it possible to obtain a product, based on minced meat, which has a uniform particle size.

In every case, the temperature of the minced mixture is kept at least at −5° C.

The product which has thus been prepared and deep-frozen holds together well on cooking.

EXAMPLE 5

A mixture is prepared containing 50% of minced meat, 25% of cooked and remoistened soya protein concentrate, as prepared in Example 3, and 25% by weight of cooked semolina mixture as indicated in Example 1; mincing, shaping and deep-freezing are carried out as indicated in Example 1.

The product thus obtained has very good taste properties.

A product based on minced meat and having the texture of minced meat is obtained in the same way by preparing a product containing 34% by weight of minced meat, 33% by weight of cooked soya protein concentrate and 33% by weight of cooked semolina mixture.

EXAMPLE 6

A semolina mixture prepared as indicated in Example 2 is mixed with cod meat in the following proportions:

| | |
|---|---|
| cod meat | 35% |
| deep-frozen cooked semolina mixture | 63% |
| dried eggs | 2% by weight |

The whole is introduced into a mincing machine kept at a temperature −5° to −10° C. and provided with a 8 mm perforated plate.

For part of the product, the first mincing operation was followed by mincing more finely, using a 2 mm perforated plate, various seasonings being mixed in at this stage.

The product leaving the mincing machine at a temperature of −5° to −10° C. is taken up by an endless screw to be shaped and is then deep-frozen or refrigerated by passing through a tunnel at −40° C.

EXAMPLE 7

Cooked and remoistened soya protein concentrate prepared in Example 3 and cooked semolina mixture prepared in Example 2 are mixed with turkey meat in the following proportions:

| | |
|---|---|
| Turkey meat | 45% |
| Cooked and remoistened soya protein concentrate | 20% |
| Cooked semolina mixture | 35% by weight |

The process is carried out in the same way as in Example 1.

The deep-frozen product holds well on cooking and has a pleasant taste.

I claim:

1. A process for the preparation of a food product suitable for grilling, roasting or frying which comprises preparing a pasty composition by wetting a flour, middling, semolina, concentrate or isolated constituent of a cereal, leguminous plant or protide-containing substance with milk, cooling this composition to a temperature not exceeding about 0° C., subsequently mixing the cooled composition at a temperature below about 0° C. with raw meat in a mincing machine, and subsequently refrigerating or deep-freezing the product.

2. A process according to claim 1 in which the cooled pasty composition is mixed with the raw meat in a first coarse mincing machine and the resulting mixture is then minced in a second fine mincing machine and the product is shaped before being refrigerated or deep-frozen.

3. A process according to claim 1 in which in the second mincing machine, whole egg, seasoning or flavoring is added.

4. A process according to claim 2 in which the outlet from the first mincing machine has apertures of size about 12 to 6 mm and the outlet from the second mincing machine has apertures of size about 6 to 2 mm.

5. A process according to claim 1 in which the moistening is carried out by heating a composition containing 10 to 25% by weight of the flour, middlings semolina or concentrate or isolated constituent, 5 to 15% by weight of powdered milk and 60 to 80% by weight of water.

* * * * *